United States Patent [19]
Dockser

[11] Patent Number: 5,706,466
[45] Date of Patent: Jan. 6, 1998

[54] VON NEUMANN SYSTEM WITH HARVARD PROCESSOR AND INSTRUCTION BUFFER

[75] Inventor: Kenneth A. Dockser, San Jose, Calif.

[73] Assignee: VLSI Technology, Inc., San Jose, Calif.

[21] Appl. No.: 372,531

[22] Filed: Jan. 13, 1995

[51] Int. Cl.$^6$ .................................................. G06F 12/00
[52] U.S. Cl. ........................................................ 395/452
[58] Field of Search ............... 364/DIG. 1 MS File, 364/DIG. 2 MS File; 395/427, 445, 452, 453, 471, 487, 800

[56] References Cited

U.S. PATENT DOCUMENTS 5,301,295  4/1994  Leary et al. .............................. 395/452

OTHER PUBLICATIONS

Stephen B. Furber, "VLSI RISC Architecture and Organization" Marcel Dekker, Inc., 1989, pp. 2-5.

Brian Case, "AMD's 29030 Lynx Reduces System Cost" reprinted from *Microprocessor Report*, vol. 5, No. 9, May 15, 1991, in *Understanding RISC Microprocessors*, Ziff–Davis Press, Emeryville, CA, 1993, pp. 5-17-5-20.

Brian Case, "AMD'S 29200 Aims at Low-Cost Cost Laser Printers" reprinted from *Microprocessor Report*, vol. 5, No. 9, May 15, 1991, in *Understanding RISC Microprocessors*, Ziff–Davis Press, Emeryville, CA, 1993, pp. 5-21-5-24.

*Primary Examiner*—Robert B. Harrell
*Attorney, Agent, or Firm*—Clifton L. Anderson

[57] ABSTRACT

A hybrid Harvard/Von Neumann data processing system utilizes a Harvard architecture processor with a combined data/instruction memory. A dual-port random-access instruction buffer between memory and the processor provides much of the performance enhancement of an instruction cache when used with a RISC instruction set, but at a much lower cost. The resulting system serves as an entry-level computer system of a series of compatible computers, led at the high end by a Harvard processor with full data and instruction caches.

12 Claims, 2 Drawing Sheets

VON NEUMANN SYSTEM WITH HARVARD PROCESSOR AND INSTRUCTION BUFFER

BACKGROUND OF THE INVENTION

The present invention relates to computer architecture and, more particularly, to communications between a processor and main memory. A major objective of the present invention is to provide a high-performance low-cost implementation Von Neumann computer system employing a Harvard architecture processor.

Much of modern progress is associated with advances in computer performance. At any given stage in the evolution of computers, computer vendors are challenged to provide a range of compatible computers at different price-performance points. Higher performance can be achieved, not only by using faster components and wider data paths, but also by using more sophisticated architectures.

Computers process data according to a program consisting of instructions. The precursors to modern computers employed a rigid distinction between instructions and data. Modern computing arrived with the introduction of the Von Neumann architecture in which instructions were stored with data in memory. This made it possible for programs such as modern operating systems to manipulate other programs.

In the Von Neumann architecture, a single read-write memory includes all data and instructions, the memory is addressable in a way which does not depend on the contents of the addressed location, and execution proceeds using instructions from consecutive locations unless an instruction or an interrupt modifies the sequence explicitly. A basic Von Neumann system includes an address bus for selecting memory locations and a data bus over which data and instructions are transferred between memory and processor.

In the basic Von Neumann architecture, the time required for the processor to fetch data and instructions is a serious constraint on performance. Cache memories relax this performance constraint. A cache memory is a small, fast memory that keeps copies of recently used memory items. When these items are used again, for example, in a program loop, they can be accessed from the cache memory instead of main memory. Instead of slower main memory access speeds, the processor can operate at faster cache access speeds most of the time. Cache memories are used extensively in high-performance computers and are migrating to smaller computer systems. In particular, cache memories are being implemented in the increasingly popular reduced instruction set computers (RISC) because they rely on fast execution of relatively high numbers of simple instructions.

Modern systems employing caches typically fetch a "line" of (e.g., four) words incorporating the data value or instruction at the requested address. This approach takes advantage of the fact that contiguous addresses tend to be called in succession. There are several reasons for this. Multi-word instructions and data values typically occupy adjacent addresses. By convention, instructions that are to be performed in succession are found at successive addresses unless a branch instruction specifies otherwise. Finally, programmers arrange instructions and data in this way to improve throughput.

Line fetches can take advantage of fast addressing modes, such as page mode. Many high-capacity memory circuits multiplex address lines to limit the number of pins required for the integrated circuit. For example, a row address can be transmitted in one cycle and a column address in a second cycle. In this case, a four-word fetch can consume eight cycles. An exemplary fast address mode allows the row address to be fixed while multiple column addresses are selected. Thus, a four-word line can be accessed in five cycles (one row, four columns), saving three cycles over the conventional addressing mode.

Typically, the lines stored in a cache are "aligned". In other words, the position of the requested memory content within a fetched line is a function of the lowest order bits of its word address in main memory. (Lower byte-address bits are not considered for this purpose.) For example, if the fetched line is four words long, the position of the requested content in the line is determined by the least significant two word-address bits. If these bits are 0,0, the requested word assumes the least significant position in the line; in this case, the other three words are found at the three next higher addresses in main memory. If the requested address ends in 1,1, the requested word assumes the most significant position in the line; in this case, the other words of the fetched line are found at the three next lower addresses in main memory. The requested word assumes intermediate positions in the fetched line if its address in main memory ends in 0,1 or 1,0.

While caches reduce the average time required for data and instruction transfers, a Von Neumann system is still constrained by the bandwidth of the data bus over which all data and instructions must travel. No matter how fast the processor, performance cannot be increased once the bandwidth of the data bus is fully used.

To overcome this Von Neumann bottleneck, computer architects have employed a modified Harvard architecture. The classical Harvard architecture, which predates the Von Neumann architecture, employs separate memories for data and instructions. A Harvard system employs four buses: data, data address, instruction, and instruction address. Because data and instructions are stored separately, programs cannot manipulate other programs; accordingly, although it is effective for certain applications, such as digital signal processing, the Harvard architecture is not suitable for general purpose computing.

The Harvard architecture can be adapted for general purpose computing by coupling a Harvard processor with a single main memory. The result is a Von Neumann system with a Harvard processor directly or indirectly multiplexed to a memory that stores both data and instructions. In a typical high end configuration, the four processor ports are coupled in pairs to distinct data and instructions caches. The caches are then multiplexed to the common memory.

An advantage of the Harvard architecture is that the use of separate data and instruction buses doubles the communications bandwidth of the system. Since the bandwidth is allocated between instructions and data in a fixed manner, the actual gain can be much less when the instruction rate and data rate are not well matched. For example, in the increasingly popular reduced instruction set computers (RISC), the instruction rate is typically six to ten times that of the data rate. With this degree of imbalance, the performance gain can be as low as 10%. Nonetheless, even a performance gain of this magnitude is significant.

A computer manufacturer might wish to use a basic Von Neumann architecture for a "low end" system and a dual-cache modified Harvard architecture for a "high end" system. However, this would require the design and development of at least two fundamentally different processors. This would be costly. Furthermore, the risks of incompatibilities due to separate design efforts would be relatively high, making it difficult to meet customer's expectations of full compatibility between systems from a common manufacturer.

It would be preferable to provide a full range of computers using a common processor core. Of course, if the core is a Von Neumann processor (with two buses: data and data address), the upper performance limits are not competitive. A more promising course is to start with a Harvard core and provide less expensive ways to incorporate it into systems. At the high end would be a full dual-cache system.

An intermediate-level system could dispense with the data cache and use only an instruction cache. In such systems, instructions are transferred from the cache to the processor using a dedicated instruction bus. Instruction transfers from memory to cache, as well as data transfers between processor and memory take place over the data bus. The AMD 29000 (made by Advanced Micro Devices in Sunnyvale, Calif.) incorporates a small on-chip branch target cache (BTC), which is a specialized instruction cache. This design uses separate data and instruction buses along with a single address bus. Thus, the intermediate approach is implemented when an AMD 29000 has its data and instruction buses interconnected and is coupled to a combined memory without off-chip caches. Advanced Micro Devices also makes a 29030 processor that uses a more general instruction cache and has an interface that includes a single data/instruction bus along with a single address bus. This design provides somewhat higher performance than the 29000 at a somewhat higher cost.

A low-end system can multiplex the address buses bus to a single memory address port and the data and instruction buses to a single memory content port. The problem is that such a cacheless modified Harvard system does not provide a significant performance advantage over somewhat less expensive basic Von Neumann systems and so is not competitive in the marketplace. Accordingly, the low-end Harvard system does not make for an attractive entry-level system. What is needed is a higher performance low-end system employing a Harvard processor. The availability of such a system would more competitively complete a range of computer offerings based on a common Harvard processor.

SUMMARY OF THE INVENTION

In accordance with the present invention, a Von Neumann data processing system includes a Harvard processor, a combined (instruction and data) memory, a buffer, a hit detector, and a controller. The buffer is used to hold a line of instructions fetched from memory for use by the processor. The buffer is preferably dual-port and random access with a capacity of at least two instructions.

The present invention is comparable to an intermediate-level modified Harvard architecture system that employs an instruction cache, but no data cache. The most apparent difference is the use of the buffer instead of a cache. Thus, only one line of instructions rather than many lines of instructions is stored. As a consequence, the line replacement algorithm that must be implemented for a cache is not required for the buffer. Hit detection is considerably faster and simpler because all addresses correspond to a single address (that of a requested instruction) and sequential offsets of that address. Thus, the circuitry required to implement the buffer and the supporting components are much less than required by instruction caches normally employed with modern data processors. All these differences translate into considerable cost savings.

When a line of instructions is fetched from main memory for storage in the buffer, the instruction with the lowest address of those in the line is the instruction at the address requested by the processor. This is the case irrespective of the address that is requested. Furthermore, the requested instruction always assumes a fixed location (e.g., the least significant address position) within the buffer, while the other instructions of the fetched line assume buffer locations as a function of the difference between their addresses in main memory and the address of the requested instruction.

To the contrary, most caches assign instruction locations within a cache line corresponding to the least significant bits of their addresses in memory. Thus, the requested instruction can assume the least significant position in a line, the most significant position in a line, or a position of intermediate significance in a cache line. By departing from conventional cache addressing schemes, the present invention makes the best use of limited buffer storage. In general, instructions at addresses lower than an executing instruction are much less likely to be requested "soon" than are instructions at higher addresses.

The requested instruction can be copied to and processed by the processor while subsequent instructions are being loaded into the buffer. If a data request is made while the buffer is being filled, the processor can be stalled until the buffer is filled. To prevent the data operation from being stalled for too long, the buffer filling can be interrupted instead. A suitable compromise involves sequentially stalling the processor while a few more instructions are loaded into the buffer, servicing the data request, releasing the stall, and resuming the instruction line fetch.

The random access buffer maintains its contents even after they are copied to the processor. Thus, the invention is particularly effective at handling instruction loops that are shorter than the buffer capacity. The increasingly prevalent RISC programs tend to have a large number of short loops that are iterated several times. For example, a sixteen-instruction buffer can include entire loops, saving instruction fetch operations. Even a two-instruction buffer can provide a performance advantage to the extent that two-instruction loops are employed. The advantage provided for efficient handling of short loops is in addition to the performance advantage provided by fast address modes that can be used during line fetches.

The net result is a data processing system which is marginally more expensive than a bare cacheless modified Harvard architecture system, but with performance surprisingly close to that of a cached modified Harvard architecture system. While program dependent, performance is optimized for programs created with increasing popular RISC instruction sets. Thus, the present invention provides a relatively low-cost modified Harvard architecture system. This system is cost competitive with available basic Von Neumann systems for low end computer systems, yet provides more assured compatibility with high end dual cache modified Harvard architecture systems. Thus, the present invention facilitates the creation of a full range of price-performance levels for a computer manufacturer. These and other features and advantages of the present invention are apparent from the description below with reference to the following drawings.

DESCRIPTION OF THE PREFERRED EMBODIMENTS

Figure 1:
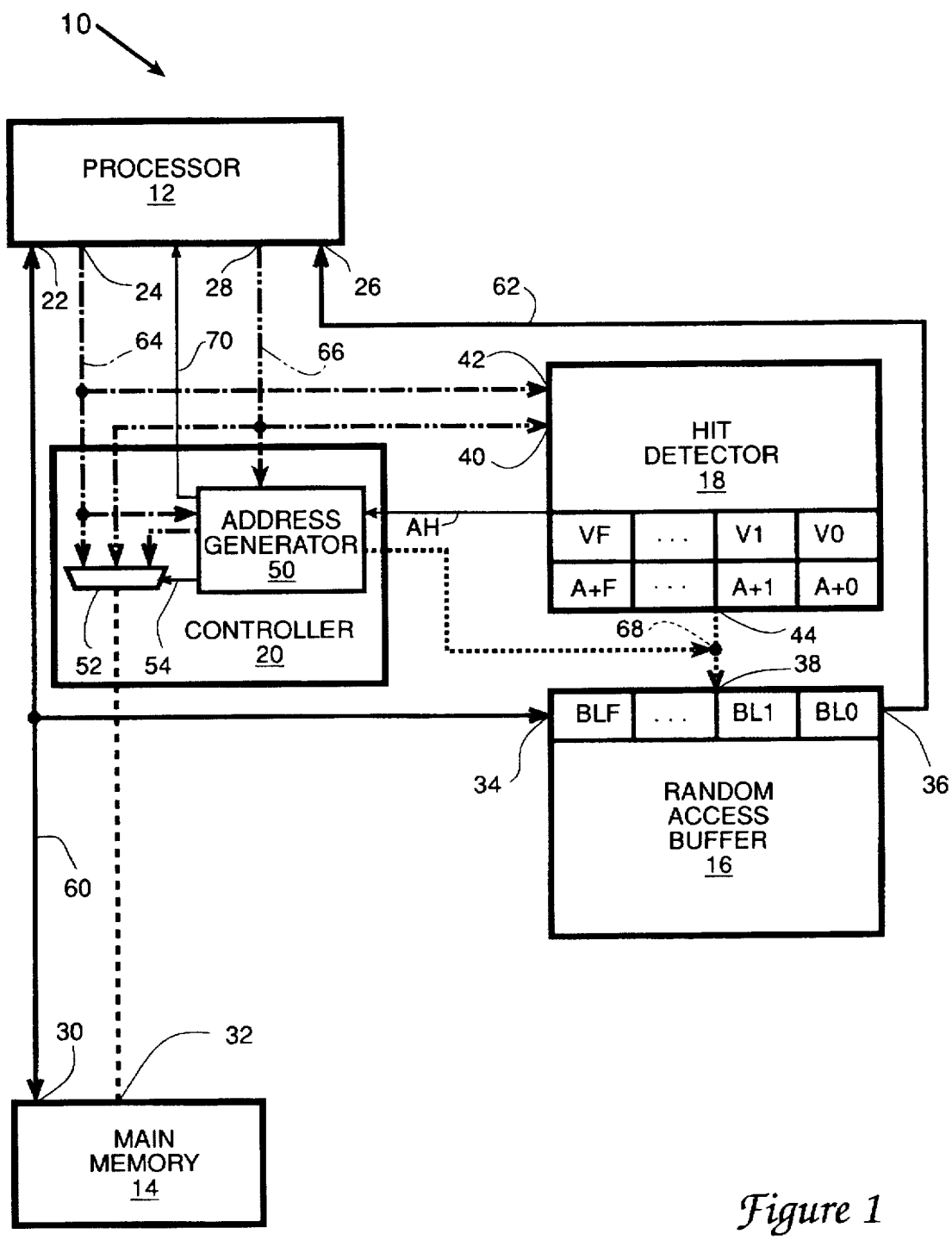
FIG. 1 is a schematic diagram of a data processing system in accordance with the present invention.

In accordance with the present invention, a data processing system 10 comprises a processor 12, a combined memory 14, a dual-ported random-access buffer 16, a hit detector 18, and an address controller 20, as shown in FIG. 1. Processor 12 is a 32-bit four-bus Harvard architecture processor for executing RISC programs. The program instructions and the data on which they are to operate are stored in memory 14. In accordance with the Harvard architecture, processor 12 includes a data port 22, a data address output 24, an instruction input 26, and an instruction address output 28.

Combined memory 14 is combined in the sense that its contents include both instructions and data used by processor 12. Memory 14 includes random-access memory comprising DRAM (dynamic random access memory) circuits and is augmented by use of a magnetic hard disk through virtual memory management. In all, memory 14 provides for $2^{32}$ 32-bit address byte (8-bit) locations, each addressable by a respective 32-bit address word. The 30 most significant address bits constitute a word address so that there are $2^{30}$ word-address locations; the remaining two least-significant address bits address individual bytes within a word. Each word-address location can store a 32-bit data word or a 32-bit instruction word. All instructions and most data for processor 12 are one 32-bit word long; data can include double or extended precision floating point values, which consume more than one address location. In accordance with Von Neumann character, memory 14 includes a content port 30, and a content address input 32.

Buffer 16 has 16 32-bit storage locations BL0, BL1, ... , and BLF (hexadecimal notation) for storing up to sixteen instructions at a time. In accordance with the present invention, the content (if any) of location BL0 is always an instruction transferred to buffer 16 as a result of a request for that instruction by processor 12. When such an instruction is transferred to buffer 16, it is accompanied by up to fifteen other instructions at successively higher combined memory addresses as part of an instruction line. These other instructions are stored at locations BL1 ... BLF, respectively. The number of buffer storage locations is selected to be larger than but comparable to the modal loop length of programs written for processor 12. Alternative embodiments have as few as two address locations and as many as 256 address locations. Larger buffers can also be used, but with diminishing performance returns. In accordance with its dual-ported random-access design, buffer 16 includes a buffer instruction input 34, a buffer instruction output 36, and a buffer address input 38.

Hit detector 18 determines whether an instruction address requested by processor 12 can be satisfied from buffer 16. Hit detector 18 includes an instruction address input 40, a data address input 42, a buffer address output 44, and an address-hit signal line AH.

Hit detector 18 includes sixteen tag locations A+0, A+1, ... A+F, where "A" represents a requested address that results in an instruction line being transferred to buffer 16. Tag location A+0 stores the 32-bit memory address of the instruction stored at buffer location BL0. The value stored in tag location A+1 is one word plus the value stored in tag location A+0 and represents the memory address of the instruction stored at BL1. The values stored at other tag locations are similarly calculated and represent the memory address of instructions stored at respective buffer locations. In practice, a single word address, e.g., corresponding to A+0, can be stored; this value can be subtracted from a requested word address and the difference compared with the stored line length. In this case, the difference can be used as an index of the location of the addressed word within buffer 16.

Addresses requested by processor 12 are compared by hit detector 18 with the contents of the tag locations to determine whether or not there is a "hit". If there is a hit, the requested instruction is transferred to processor 12 from buffer 16. If there is a miss, an instruction line is transferred from memory 14 to buffer 16, and then the instruction at buffer location BL0 is transferred to processor 12.

Associated with each tag location A+0–A+F, is a respective validity bit V0–VF. The validity indicates whether the instruction stored at the respective buffer location BL0–BLF matches the contents of main memory 14 at the address indicated at the respective tag location. The contents of buffer 16 are invalid before the first instruction transfer is made. In some cases, an instruction line includes fewer than sixteen instructions because the requested address is too close to a memory page boundary. In this case, buffer locations, e.g., BL9–BLF, are left unfilled by the shortened instruction line and the respective validity bits, e.g., V9–VF, indicate invalidity.

However, the primary use of the validity bits is to prevent inconsistencies between memory 14 and buffer 16 due to self-modifying code. Hit detector 18 determines when data is written to an address represented in a tag location; in that event, the respective validity bit is used to mark the corresponding buffer location as invalid. An alternative approach is to declare the entire buffer contents invalid, using only one validity bit for the entire buffer. A more sophisticated alternative is to copy the written data to the respective buffer location to restore the consistency of buffer 16.

Address controller 20 generates addresses and controls the flow of addresses among the components of data processing system 10. It has inputs coupled to processor data address output 24, to processor instruction address output 28, and to hit detector 18 for receiving address hit indications. Controller 20 has outputs to the memory content address input 32 and buffer address input 38.

Address controller 20 includes an address generator 50 and a multiplexer 52. Address generator 50 receives processor instruction address requests and address hit and data hit indications. It outputs memory addresses and buffer addresses. It also provides a control signal to multiplexer 52 along a control line 54. Multiplexer 52 selectively couples memory content address input 32 to processor data address output 24, processor instruction address output 28, and the memory address output of address generator 50.

Figure 2:
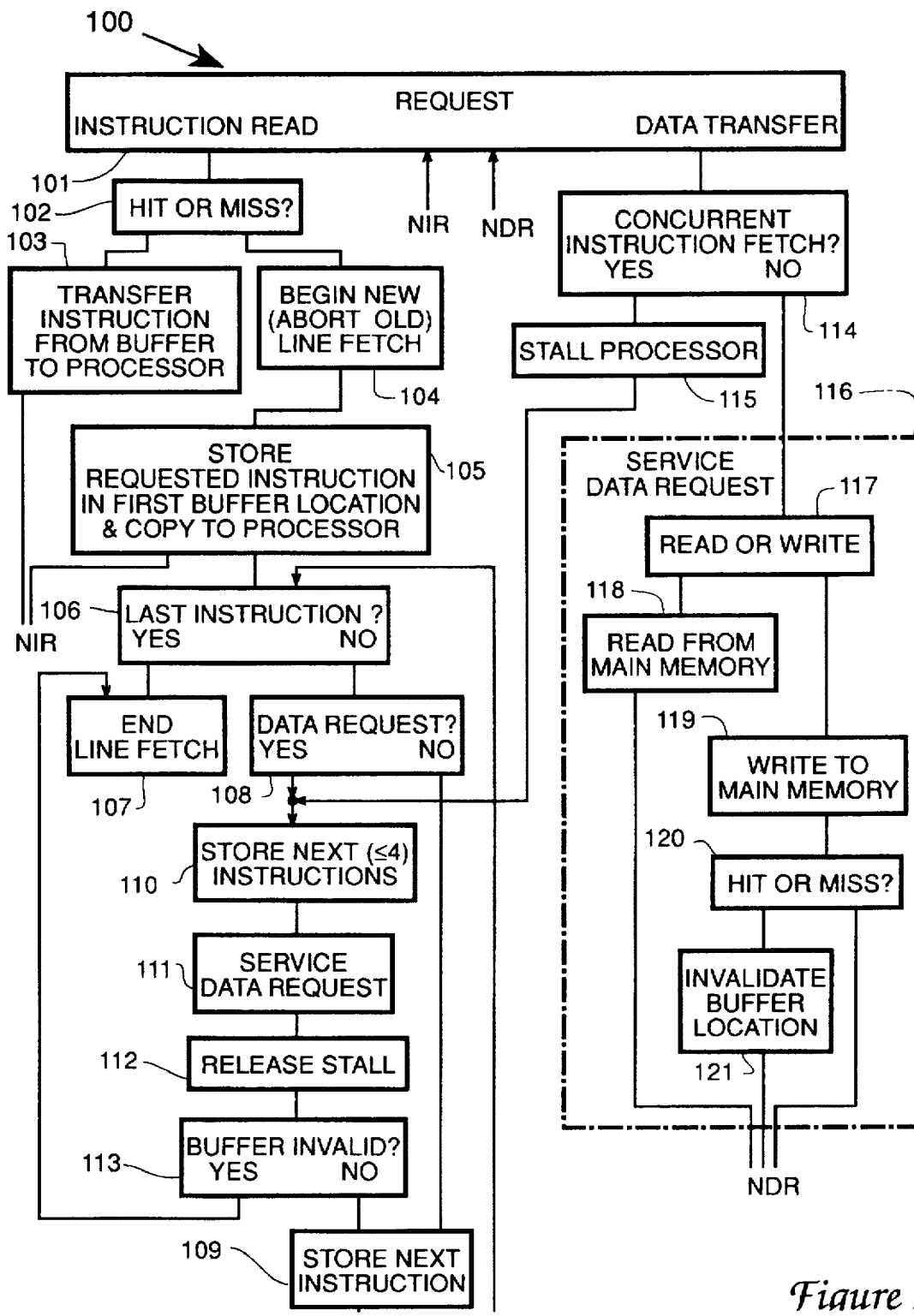
FIG. 2 is a flow chart of a method employed by the system of FIG. 1.

Address generator 50 can output a "stall" signal along line 70 to processor 12 to temporarily prevent the processor from advancing to the next instruction during main memory accesses. Requests for instructions stored in buffer 16 can be filled in the same processor cycle in which the request is made; accordingly, no stall is required. For data processing system 10, an additional processor cycle is required to fulfill data requests and instruction misses from main memory. Accordingly, address generator 50 asserts a one-cycle stall to processor 12 in most cases. (The number of cycles required per main memory fetch, and thus the number of stalled cycles, can vary according to a number of factors, including memory speed.) A longer stall is required if a data request is made either concurrent with an instruction miss or during an instruction line fetch as explained subsequently. (Note that only this longer type of stall is represented in FIG. 2.)

A data bus 60 "permanently" couples memory content port 30 to processor data port 22 for two-way data transfers. Data bus 60 also couples memory content port 30 to buffer instruction input 34 for instruction line transfers from memory 14 to buffer 16. In a more sophisticated implementation, data writes can be transferred from either processor 12 or memory 14 to buffer 16 to maintain cache consistency in the face of self-modifying code. However, the basic mode of data processing system 10 does not support this method of maintaining buffer consistency. An instruction bus 62 permanently couples processor instruction input 26 to buffer instruction output 36 to permit instruction transfers from buffer 16 to processor 12.

An instruction address bus 66 couples processor instruction address output 28 to hit detector instruction address input 40 and to address controller 20. Within address controller 20, instruction address bus 66 couples to inputs of address generator 50 and multiplexer 52. Instruction address bus 66 not only includes lines bearing address bits, but also an "instruction request control line" that indicates when an instruction is being requested.

A data address bus 64 couples processor data address output 24 to hit detector data address input 42 as well as to an input of multiplexer 52 (and thus of controller 20). A buffer address bus 68 couples buffer address input 38 to hit detector buffer address output 44 and to the buffer address output of address generator 50 (and thus of address controller 20). Data address bus 64 includes not only data lines, but also a "data request control line" to indicate when a data transfer is being requested and a "read versus write" control line to indicate whether processor 12 is reading data from memory 14 or writing data to memory 14.

A method 100 employed by data processing system 10 is flow charted in FIG. 2. When the processor makes an address request at step 101, an initial distinction is made between a request for an instruction read and a data transfer. This distinction is indicated by activity on control lines associated respectively with the data address bus and with the instruction address bus.

In the event of an instruction read request, the hit detector determines whether or not the address requested is validly represented in the buffer at step 102. If the address is validly represented, the requested instruction is transferred from the buffer to the processor at step 103. After step 103, method 100 provides for a next instruction request as indicated by NIR.

If the requested address is not represented in the buffer or if the respective validity bit of the hit detector indicates that the buffer location representing the requested address is invalid, the hit detector so signals the address generator and invalidates all validity bits. The address generator then initiates an instruction line fetch at step 104.

The fact that an instruction fetch has begun does not preclude further instruction requests from being issued during the fetch. If a subsequent instruction request results in a hit, no special problem is presented. A miss can be indicated where a branch instruction calls for an address not represented in the instruction line being fetched. A miss can also be indicated where the address is represented in the line, but the instruction at that address is not stored in the buffer by the end of the processor cycle in which the request is made. In this latter case, the corresponding validity bit indicates invalidity. Whether an actual miss or an invalid hit occurs, the result is that the ongoing fetch is aborted and a "new" instruction line is fetched beginning with the subsequently requested address.

Each line fetch begins with the storage of the requested instruction at the first buffer location at step 105. This instruction is then immediately copied to the processor at step 105. This permits the processor to continue operation while subsequent instructions in the fetched line are being stored in the buffer. Thus a next instruction request NIR can follow completion of step 105.

As each instruction of a fetched line is stored in the buffer, the address generator checks, at step 106, whether it was the last instruction of the fetched instruction line. To this end, the address generator can include a down counter preset to correspond to the size of the buffer. While in the preferred embodiment, an uninterrupted line fetch always fills the buffer, alternative embodiments provide for short instruction lines imposed by boundaries defined within main memory. The short instruction lines can be provided for by an address generator that sets its counter to correspond to main memory boundaries. Alternatively, a main memory can provide feedback used to terminate address generation during line fetches. If a short line is fetched, the validity bits for the unfilled buffer location are left invalid. In any event, if the last instruction has been stored, the instruction line fetch is terminated at step 107.

If step 106 indicates that there are further instructions in the fetched line to be stored in the buffer, the address generator checks the data address bus to determine if a data request is pending at step 108. If no data request is pending, the next instruction in the fetched line is stored in the buffer at step 109. If a data request is pending at step 108, the address generator causes the next four instructions in the instruction line to be stored in the buffer at step 110. Of course, if there are no more than four instructions yet to be stored, this step results in the completion of the instruction line fetch. Otherwise, step 110 terminates with a number of instructions yet to be stored in the buffer.

Once step 110 is terminated, the pending data request is serviced at step 111, and a previously imposed processor stall associated with the pending data request indicated at step 108 is released at step 112. A detailed breakdown of data request service step 111 is provided in connection with analogous data request service step 116. As that detailed breakdown makes clear, self-modifying program code can result in a data address hit, detected by the hit detector. In one mode of operation, the hit detector invalidates the buffer globally. Accordingly, a data hit can result in an invalid buffer. Step 113 checks for this condition. If the buffer is invalid, continuing the line fetch would be futile. Accordingly, a determination at step 113 of an invalid buffer results in an end to the line fetch, at step 107.

In the absence of a data hit or in a hit detector mode in which individual buffer locations are declared invalid individually, step 113 determines that the buffer is valid. In this case, the next instruction in the fetched line is stored at step 109. Whether step 109 is reached from step 108 or step 113, it is followed by a return to step 106, which determines whether the last instruction has been stored or not. The loop bracketed by steps 106 and 109 is normally iterated until the last instruction is fetched, in which case the loop is broken by end line fetch step 107. This completes the analysis of method 100 when begun by a request for an instruction read.

In the event that a request for a data transfer is made at step 101, an initial determination is made, at step 114, as to whether there is a concurrent instruction fetch. If an instruction fetch is ongoing, the processor is stalled while additional instructions are stored, at step 115. Note that the paths to step 110 from steps 108 and 115 are necessarily concurrent. This distinguishes step 110 from steps 106, 107, and 109, each of which can be entered independently from two other steps.

If, when a data request is made and there is no concurrent instruction fetch, as determined at step 114, the data request is serviced at step 116. Data request service step 116 includes substeps 117-121, As indicated above, analogous substeps constitute data request service step 111.

The address generator determines whether the requested data transfer involves a read or a write according to the control lines associated with the data address bus. If a data read is requested, the requested data is transferred from main memory to the processor at substep 118. Method 100 then returns to step 101 for the next data request as indicated by NDR.

If a data write is requested, the data is written from the processor to main memory at substep 119. The hit detector determines, at step 120, whether the address of a requested data write results in a hit or miss for the addresses represented in the buffer. Method 100 provides three modes for handling self-modifying code (i.e., a program that makes data writes to locations accessed for instructions). In the preferred mode, a valid hit during a data write results in an invalidity indication for the individual buffer location corresponding to the memory address to which data is written being. For example, if data is written to the memory address represented at address tag A+1, then validity bit V1 is set to invalid; the other validity bits are not changed.

If a miss (or invalid hit) is determined, a next data request can be processed as indicated at NDR. If a valid hit is determined and buffer validity is determined globally, the validity indication for the buffer is set to invalid at substep 121. (It is the corresponding substep for data request service step 111 that requires the buffer invalid determination of step 113.) If a valid data write hit is determined and buffer validity is set per instruction, only the validity bit for the hit buffer location is set to invalid. Once the appropriate invalidity is indicated, method 100 provides for a next data request as indicated at NDR.

The operation of data processing system 10 is described in further detail with reference again to FIG. 1. When processor 12 requires an instruction, it transmits the address of that instruction from instruction address output 28. This instruction address is received by hit detector 18 at its instruction address input 40. Hit detector 18 compares the requested address with those stored in tag locations A+0—A+F. If a match is found, the corresponding validity bit V0-VF is checked.

In the event of a valid match, hit detector 18 transmits the buffer address corresponding to the tag location where the match was found. The buffer address is transmitted from hit-detector buffer address output 44 along buffer address bus 68 to buffer address input 38. The instruction at the addressed buffer location is transferred from buffer instruction output 36 along instruction bus 62 to instruction input 26 of processor 12.

In the event of an instruction address miss or an invalid match, hit detector 18 conveys an address miss indication to address generator 50 along line AH. In response, address generator 50 sends a control signal along control line 54 to couple memory content address input 32 to processor instruction address output 28.

Memory 14 responds by transmitting the instruction at the requested address along data bus 60 to buffer instruction input 34. Concurrently, address generator 50 transmits buffer address BL0 to buffer address input 38. Accordingly, the fetched instruction is stored at buffer address BL0. Immediately thereafter, the instruction is transmitted out buffer instruction output 36 along instruction bus 62 to instruction input 26 of processor 12.

In the meantime, address generator 50 generates a control signal to couple memory content address input to address generator 50. Address generator 50 then generates the fifteen addresses that succeed the requested address. The corresponding fifteen instructions are thus forwarded to buffer 16. Address generator 50 synchronously generates successive buffer addresses BL1-BLF so that the fifteen successive instructions are stored respective therein. The requested address is stored in tag location A+0, while increments thereof are entered into the other fifteen tag locations. The validity bits are all set to valid indications. Where a requested address is near a page boundary, fewer than sixteen instructions may be transferred. In this case, the validity bits for untilled buffer locations are set to indicate invalid contents. This completes the instruction request cycle.

When processor 12 requires data, it transmits the address of the required data (along with a read versus write control signal that is treated herein as transmitted along data address bus 64) from data address output 24. The read indication informs hit detector 18 that this address can be ignored. Address generator 50 leaves data address bus 64 coupled to memory content address input 32 by default in the absence of activity on instruction address bus 66. Accordingly, memory 14 transmits the data value at the requested address output memory content port 30 along data bus 60 to data port 22 of processor 12. This completes the data read cycle.

When processor 12 is to write data, it outputs the write request and the request address from data address port 24 and outputs the data to be written from data port 22. By default, multiplexer 52 couples data address port 24 to memory address input 32. In response, memory 14 writes the data to the requested address. In the meantime, hit detector 18 determines whether the address received at hit data address input 42 matches any of the addresses in the tag locations. If there is no hit, no further action is taken by hit detector 18.

If a data write operation results in a valid hit detection, then the instruction at the hit buffer location no longer reflects the address from which the instruction was fetched. Accordingly, hit detector 18 sets the respective validity bit to indicate invalid contents at the corresponding buffer location. This completes the data write operation. The operation of address generator 50 is unaffected by a data hit, so no data hit indication need be provided from hit detector 18 to address generator 50.

In a "global" mode, hit detector 18 uses a single flag to indicate validity or invalidity of entire buffer 16. When a data write results in a hit, the buffer contents are collectively invalidated. Accordingly, the next instruction request results in a miss and a new line fetch. In the preferred "individual" mode, hit detector only invalidates the buffer location at which the hit occurred. This reduces the number of line fetches required. In addition, the individual mode is compatible with embodiments in which incomplete line fetches are permitted (e.g., to accommodate page boundaries). In a "data write to buffer" mode, when a hit occurs, data is written concurrently to main memory 14 and the hit buffer location; this forces the buffer to retain its validity in the event of self-modifying code.

Once processor 12 has received the first (requested) instruction of a line fetch, it can resume execution while the subsequent instructions of the line are being fetched. By the time processor 12 requests a next instruction, at least one of the succeeding instructions will have been stored in the buffer. So long as the next requested instruction is sequential (i.e., not the result of a branch) the request should result in a valid hit. The requested instruction can be transmitted from buffer 16 to processor 12 for processing as usual.

If a data request occurs during a line fill, the data access is stalled to take advantage of the fast page-mode addressing using during the line fetch. If a line fetch is concurrent, address generator 50 asserts a "stall" signal along line 70 to processor 12. When the stall signal is asserted, processor 12 will not advance to the next instruction. Address generator 50 continues to assert the stall signal until the line fetch is completed or, if sooner, four cycles have past. In the latter event, four additional instructions will have been loaded into buffer 16. Loading of any remaining instructions in the line continues once the data request is serviced; however, if a data write results in global invalidation of buffer 16, the line fetch is aborted.

For embodiments with small buffers, the stall signal can be asserted until the buffer is filled; interruption of buffer fills is increasingly important for larger buffer capacities. Alternatively, the instruction line fetch could be interrupted immediately upon a data request. In most cases, this latter approach would not make optimal use of any fast addressing modes.

The present invention provides for a range of buffer sizes. Even a two-instruction buffer can take advantage of two-instruction loops. Many RISC programs contain a large number of 4–16 instruction loops, hence the selection of a 16-instruction capacity for buffer 16. Another trend in designing instruction sets is the inclusion of conditional instructions. These are instructions that are only performed when certain conditions (such as the setting of a zero flag) are met. The use of such instructions can reduce the frequency of branch instructions. For processors utilizing instruction sets with such conditional instructions, a buffer holding as many as 256 instructions can be used with good advantage. Buffers with capacities larger than 256 instructions would not in general be competitive with caches of like capacity. These and other modifications to and variations upon the preferred embodiments are provided for by the present invention, the scope of which is limited only by the following claims.

What is claimed is:

1. A data processing system comprising:
   main memory having contents stored at respective memory addresses, said contents including data and instructions, said main memory having a content port for receiving data and for sending data, said main memory having a content address port for receiving address requests for selecting memory addresses from which to read contents to be transmitted and to which to write received contents;
   a Harvard architecture central processor having a data port through which data transfers from and to said processor are made, a data address port from which data address requests are made, an instruction port at which instructions are received, and an instruction address port from which instruction address requests are made;
   a single-line multi-instruction buffer having plural buffer address locations including a first buffer address location, each of said buffer locations providing for storage of an instruction;
   a hit detector for determining whether an instruction address requested by said processor is represented in said buffer, said hit detector being coupled to said instruction address port;
   control means for controlling the flow of addresses and contents among the foregoing elements, said control means causing a data address transmitted by said processor to be received at said content address port and causing said contents to be transferred between said content port and said data port, said control means causing an instruction stored in said buffer to be transferred to said instruction port when said hit means indicates that the instruction address requested by said processor is represented in said buffer, said control means causing a line of instructions at consecutive main memory addresses beginning with the address of the requested instruction to be transferred in response to an instruction request when said hit means indicates the requested instruction is not represented in said buffer so that said requested instruction is stored at said first buffer address location and so that any remaining instructions of said line are stored at buffer address locations other than said first buffer address location.

2. A data processing system as recited in claim 1 wherein when, while said line of instructions is being transferred to said buffer, said processor makes a data address request, said control means stalls said processor until additional instructions of said line are stored in said buffer, after which said controller permits the requested data transfer.

3. A data processing system as recited in claim 2 wherein, after said additional instructions are stored in said buffer, if additional instructions of said line remain to be stored in said buffer, these are stored after said data transfer is effected.

4. A data processing system as recited in claim 1 wherein said hit detector is coupled to said data instruction port so as to indicate whether an address to be written to in said main memory is represented in said buffer.

5. A data processing system as recited in claim 4 wherein said hit detector flags an address location of said buffer as invalid when the corresponding main memory address is written to.

6. A data processing system as recited in claim 1 wherein said buffer is a random access buffer having a capacity of at least two instructions.

7. A method of managing communication between a Harvard architecture processor and a main memory, said method comprising the steps of:
   determining whether an instruction requested by said processor is in a single-line multi-instruction buffer having plural buffer address locations including a first address location;
   if the requested instruction is in the buffer, providing it to the processor via its instruction port;
   if the requested instruction is not in the buffer, fetching a line of instructions beginning with said requested instruction, storing said requested instruction at said first address location irrespective of the address of the requested instruction in main memory, storing other instructions in said line at buffer address locations other than said first address location, and copying said requested instruction from said buffer to said processor via said instruction port.

8. A method as recited in claim 7 further comprising:
   in the event said processor requests a data write, determining whether the main memory address to which data is to be written is represented in said buffer.

9. A method as recited in claim 8 further comprising the step of indicating that the instruction stored at a buffer address location corresponding to an address in main memory to which data has been written by said processor is invalid.

10. A method as recited in claim 7 further comprising, in the event said processor requests a data transfer when only some instructions of said line have been stored in said buffer, the step of stalling said processor until additional instructions of said line are stored in said buffer.

11. A method as recited in claim 10 wherein, if after storing said additional instructions of said line in said buffer further instructions of said line are yet to be stored in said buffer, then storing of instructions in said buffer resumes after said data transfer is effected.

12. A method as recited in claim 7 wherein said buffer is a random access buffer having a capacity of at least two instructions.

* * * * *